April 4, 1961   S. HERSH ET AL   2,977,851
THRUST BEARING ASSEMBLY

Filed April 16, 1953   3 Sheets-Sheet 1

INVENTORS
SIDNEY HERSH
JOHN J. LACOMBE
BY
ATTORNEYS

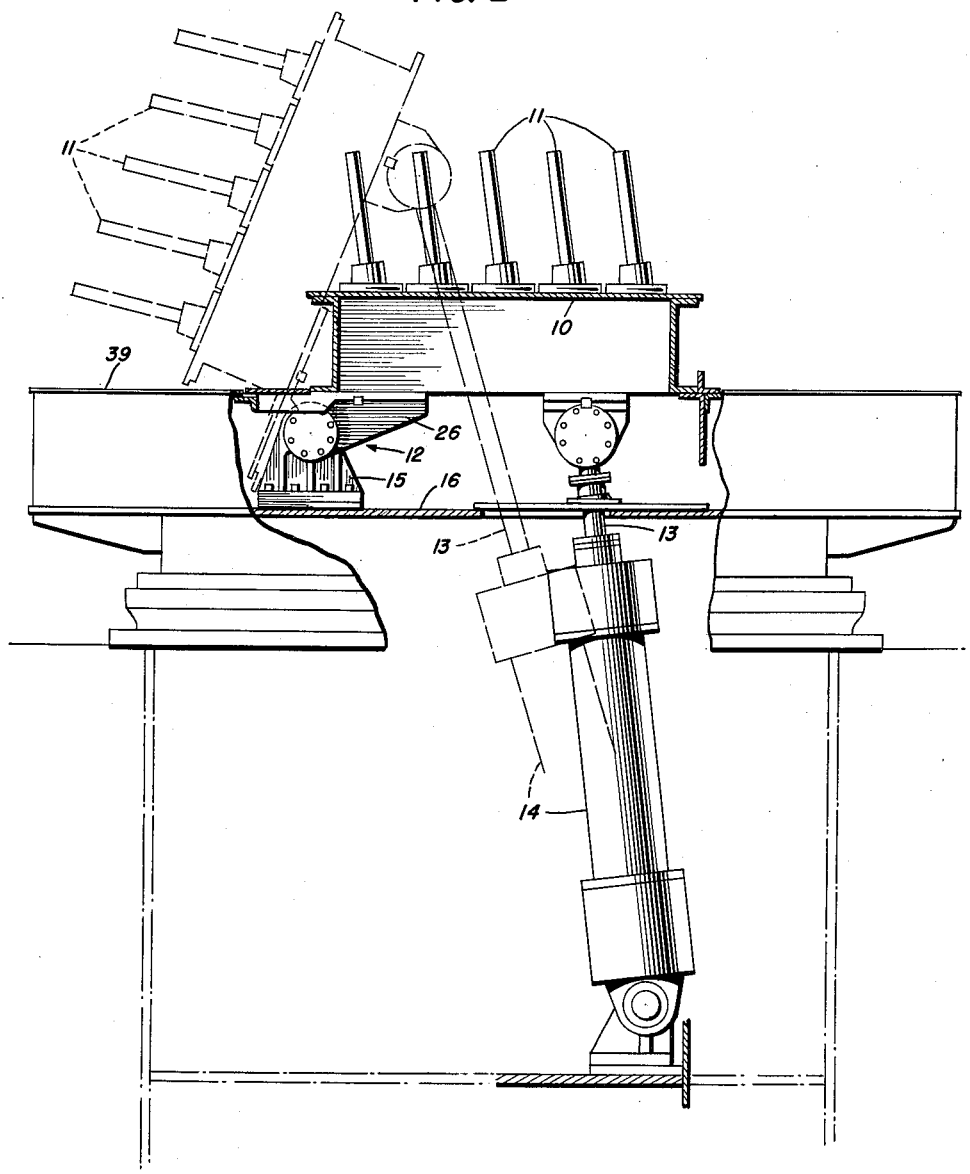

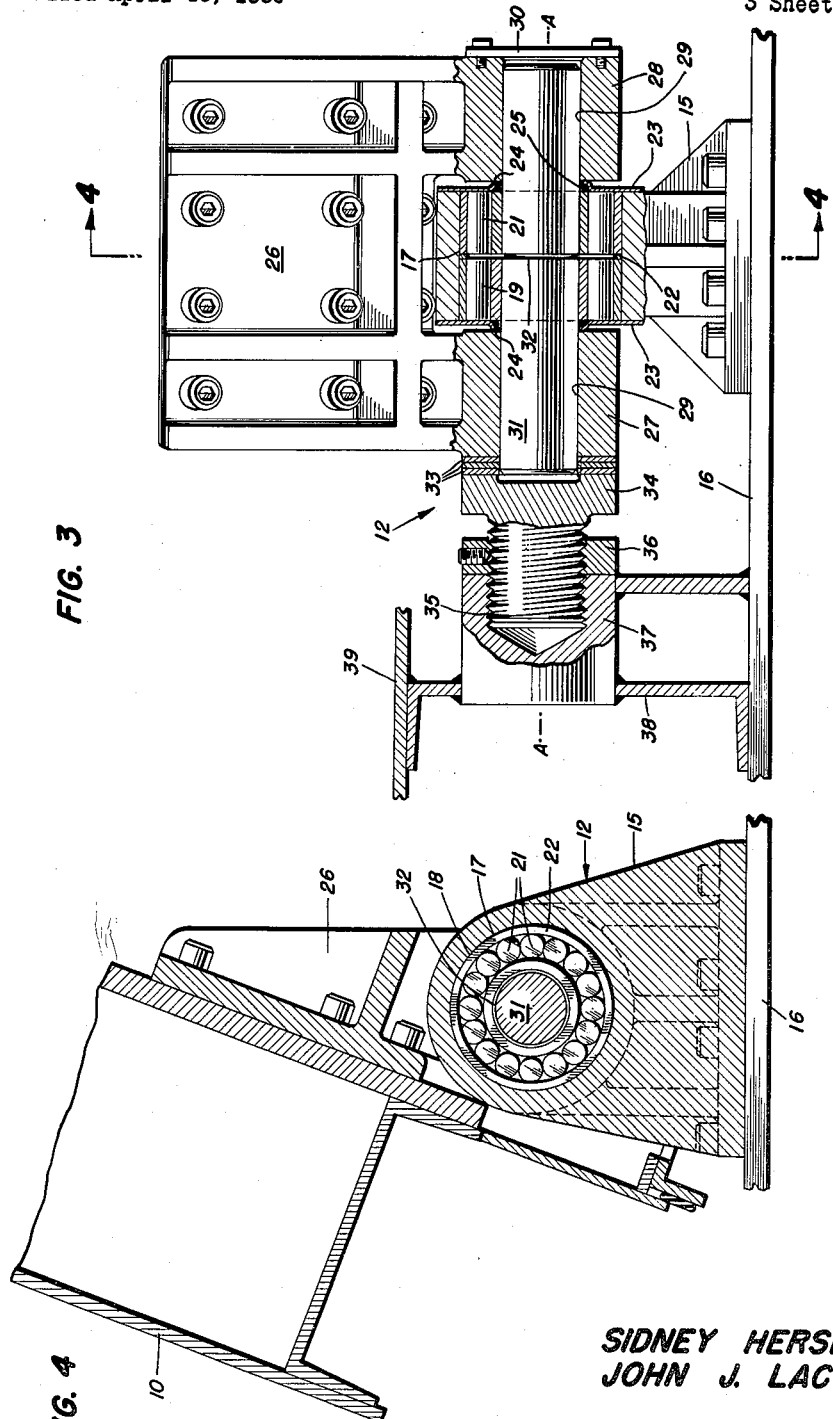

United States Patent Office 2,977,851
Patented Apr. 4, 1961

2,977,851
THRUST BEARING ASSEMBLY

Sidney Hersh, Silver Spring, and John J. Lacombe, Landover Hills, Md., assignors to the United States of America as represented by the Secretary of the Navy Filed Apr. 16, 1953, Ser. No. 349,329

4 Claims. (Cl. 89—1)

(Granted under Title 35, U.S. Code (1952), sec. 266)

The invention described herein may be manufactured and used by or for the Government of the United States of America for governmental purposes without the payment of any royalties thereon or therefor.

This invention relates to a new and novel thrust bearing and more particularly to a thrust bearing of the type employed in conjunction with a projector mount or missile launcher for projecting depth charges against underwater targets for example, such as the type known as the hedgehog projector.

Heretofore difficulty has been experienced under certain conditions of operation when a transverse load was transmitted to the base ring structure of a mount for a hedgehog projector of the type disclosed in application Serial No. 302,284, filed August 1, 1952, in the name of Charles A. Johnstone et al. and entitled "Apparatus for and Method of Varying Initial Velocity of Hedgehog Projector Charges."

One such difficulty previously encountered has been the presence of an extreme transverse load on one of the firing platform trunnion bearing assemblies in the event of a misfire. Under normal conditions such a transverse load on the trunnion bearing assemblies does not occur when corresponding projectors which are symmetrically distributed on opposite sides of the longitudinal center line of the firing platform are ignited because under such conditions a balanced load is transmitted to the trunnion bearings and the transverse components of the firing load counteract and cancel one another. However, in the event of a misfire, as previously mentioned, the transverse component of the firing load of the projector which was fired will be transmitted to the trunnion diagonally opposite therefrom and will act directly upon the bearings carried by that trunnion. This undesirable transverse load has, on occasions, prevented elevation adjustments of the firing platform subsequent to the misfire.

Accordingly, the present invention contemplates the provision of structure which will enable an unbalanced transverse component of a firing load to be transmitted to the base ring structure of the projector in such a manner as to by-pass the trunnion bearings to thereby prevent the occurence of misfire from affecting subsequent elevation adjustments of the firing platform.

Therefore, one of the objects of the present invention resides in the provision of structure associated with the trunnion bearings and firing platform of a hedgehog projector for transmitting and dissipating a transverse load without allowing the load to pass through the trunnion bearings.

Another object is the provision of structure for the mounting of a firing platform of a hedgehog projector, which structure will insure against an unbalanced load being placed on the trunnion bearing as a result of misfires.

Yet another object of the instant invention is the provision of structural elements which will allow for elevation adjustments of the firing platform irrespective of transverse load components exerted against such elements by reason of misfires.

An additional object of the present invention resides in the provision of a longitudinally adjustable load transmitting spanner assembly secured between the firing platform trunning bracket and a channel member secured to the base ring of a rocket launcher.

Still another object resides in the provision of a rugged, economically manufactured, and readily assembled and adjusted load transmitting assembly for accomplishing the foregoing objects.

Other objects and many of the attendant advantages of this invention will be readily appreciated as the same becomes better understood by reference to the following detailed description when considered in connection with the accompanying drawings wherein:

Fig. 2 is a side elevation of the structure disclosed in Fig. 1 with parts broken away along a line substantially corresponding to line 2—2 in Fig. 1 to better illustrate the location of the trunnion bracket assembly with respect to other structure of the launcher as well as the manner in which it functions when the firing platform is elevated;

Figure 1:
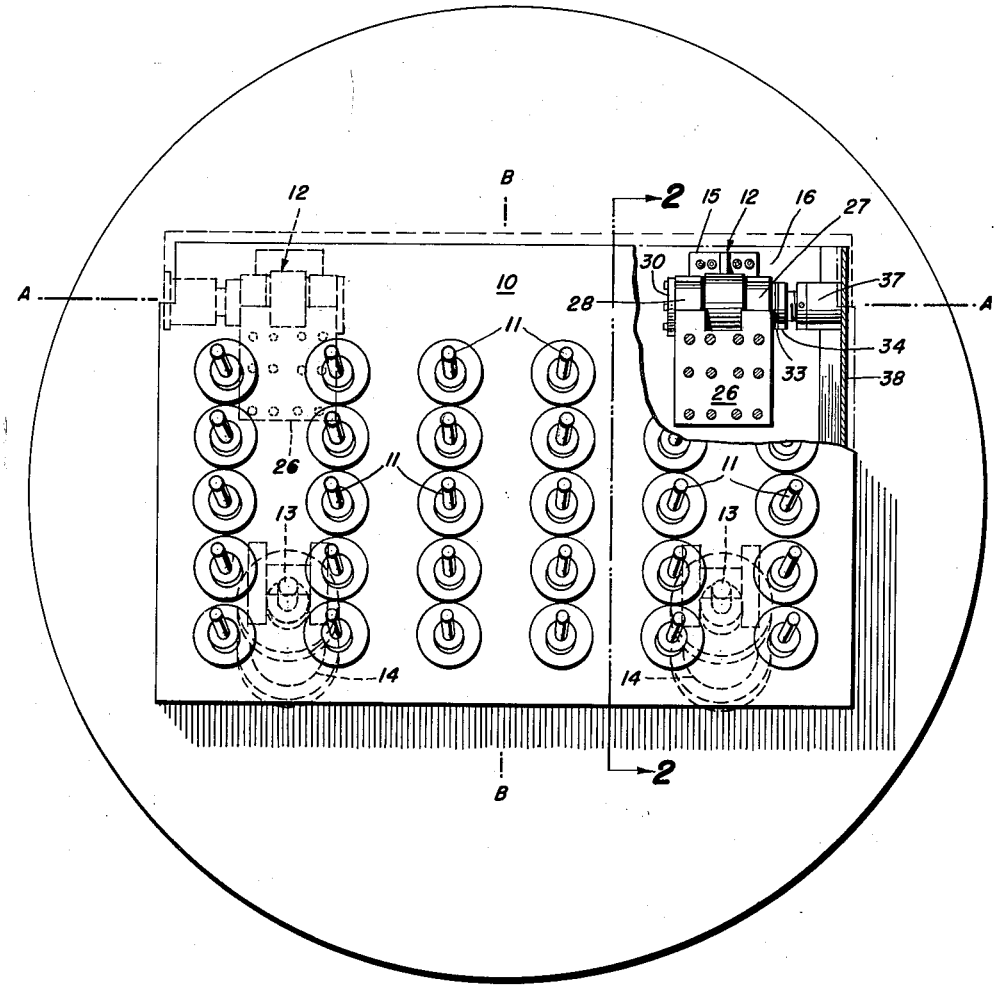
Fig. 1 is a top plan view with parts broken away of a firing platform for missile launchers of the hedgehog type and illustrating the location of the trunnion bracket bearing assembly of the present invention relative to the firing platform and elevating mechanism therefor.

Fig. 3 is a longitudinal section view of the trunnion bracket assembly of the present invention including a fragmentary showing of a portion of the base ring structure to which the invention is adjustably secured; and Fig. 4 is a vertical section view taken along a line substantially corresponding to line 4—4 in Fig. 3 of the trunnion bracket assembly and illustrating the relationship of the assembly to the firing platform when the latter is in an elevated position.

Referring now to the several figures of the drawing and more particularly to Figs. 1 and 2 thereof, it will be observed that a firing platform 10 having a plurality of charge receiving spigots 11 secured thereto in the manner described in the afore-mentioned application is mounted at one end thereof to a pair of trunnion supports generally designated by the numeral 12 to provide for pivotal movement of the firing platform about the horizontal axis A—A of the trunnions. At the other end of firing platform 10, a pair of piston rods 13 are pivotally secured at one end thereof to opposite corners of the firing platform. Piston rods 13 are provided with suitable pistons disposed within hydraulic cylinders 14 which may be connected in any manner found suitable for the purpose to a hydraulic supply system (not shown) to thereby rotate the firing platform about the trunnion axis A—A. It will be apparent that rotation of the firing platform in the manner described makes possible numerous elevation or range settings for the firing platform and the charge receiving spigots 11 associated therewith.

Although it is customary to fire an equal number of spigots symmetrically mounted on opposite sides of center line B—B of the firing platform thereby preventing transverse firing loads from being distributed to trunnions 12, on occasions misfires may occur to thereby produce an uneven transverse firing load upon the trunnions and the trunnion bearings. Such loads are of a large magnitude and make it difficult if not impossible to elevate the firing platform.

Reference is now made to Figs. 3 and 4 wherein the structure of the present invention is disclosed and which eliminates the afore-mentioned disadvantage of a conventional trunnion bearing assembly.

A base ring trunnion bracket 15 is secured in any desired fashion such, for example, as by bolts to the base ring 16 of the missile launcher and is provided with an upstanding hollow portion 17 having a transverse opening 18 therein. Any suitable bearings as roller bearing assemblies 19 and 21, for example, may be employed. Each bearing assembly may be provided with any type of cage and raceway found suitable for the purpose. The bearing assemblies 19 and 21 are spaced from one another by a spacer ring 22. A pair of end caps 23 prevent transverse movement of the bearing assemblies. Each end cap 23 has an outwardly struck flange 24 forming a circular groove at the inner portion thereof for the retention of O-ring 25. It will be observed that the flange 24 and its associated O-ring 25 maintain bearing assemblies 19 and 21 spaced from the firing platform trunnion bracket 26 which would subject the bearing assemblies to a transverse load of large magnitude in the event of a misfire of one of the spigots as afore-mentioned.

The firing platform 10 has secured thereto the firing platform trunnion bracket 26 which includes a yoke portion having legs 27 and 28 at the lower end thereof, as best disclosed in Fig. 3. Legs 27 and 28 are provided with bores 29 in transverse alignment with one another and with the opening provided by the inner raceways of bearing assemblies 19 and 21 carried by the base ring trunnion bracket. A trunnion shaft 31 functions to secure the firing platform trunnion bracket 26 to the base ring trunnion bracket 15 and thereby pivotally secures the firing platform 10 to the base ring 16. A lubricating recess 32 is located substantially at the mid-point of trunnion shaft 31 so as to assure proper lubrication of the shaft and bearing assemblies. An end plate 30 retains the trunnion shaft against longitudinal movement to the right, as viewed in Fig. 3.

The other end of trunnion shaft 31 extends beyond the edge of firing platform trunnion bracket 26 to thereby provide a mounting support for a plurality of metallic thrust bearings or discs, generally indicated at 33 and which may be of any metal found suitable for the purpose. By way of example, it has been found that if the outermost discs are composed of steel and the intermediate disc is composed of bronze a suitable disc assembly is provided for withstanding and carrying any transverse firing load to which the assembly may be subjected while, at the same time, permitting the firing platform trunnion bracket 26 to be tilted about the horizontal axis A—A during elevation of the firing platform. It will be understood that the discs 33 may be provided with suitable lubricating grooves (not shown) if so desired. This end of shaft 31 is substantially flush with the outer surface of the outermost steel washer.

The outer washer is in contact with the bearing face of the cupped head 34 of a thrust screw 35. Thrust screw 35 is threaded into a lock nut 36 and socket 37. Socket 37 may be secured in any suitable fashion, as by welding, to a channel member 38 which is, in turn, secured at the lower edge thereof to the base ring 16. The upper edge of channel member 38 is secured to plate 39 which is part of the base ring structure. An additional supporting member 39 may be rigidly secured to socket 37 and base ring 16.

It will be apparent from an inspection of Figs. 3 and 4 that the structure of the present invention allows for not only a maximum elevation of the firing platform which approximates a vertical position but also there is provided a structure through which an unbalanced transverse firing load may be dissipated to the base ring structure regardless of the elevation adjustment of the firing platform.

To assemble the assembly, the firing platform trunnion bracket 26, base ring trunnion bracket 15, bearings 19 and 21 and shaft 31 are first secured to one another. This is accomplished by first inserting the bearing assemblies 19 and 21 within the upstanding portion 17 of base ring trunnion bracket 15 and securing the bearing assemblies in position by mounting end caps 23 on each side of upstanding portion 17. Next, the fork legs 27 and 28 of the firing platform trunnion bracket 26 are positioned on either side of upstanding portion 17 and trunnion shaft 31 inserted into the bores 29 so as to connect the trunnion brackets to one another. End cap 30 is then secured in place. Then the base ring trunnion bracket 15 is bolted or welded, as desired, to the base ring 16. Next, the thrust screw 35 carrying lock nut 36 is threaded to its full extent into socket 37 which is then bolted or welded to the channel member 38. The slip discs 33 are then placed on the protruding end of trunnion shaft 31 and the thrust screw 35 is backed off until the washers are in contact with the bearing face of the cupped head 34 whereupon lock nut 36 is secured. Finally, the firing platform 10 is bolted or welded to the firing platform trunnion bracket 26.

In the event of a misfire, the transverse firing load will be dissipated through a path which may be traced as follows: from the firing platform 10 to the firing platform trunnion bracket 26, discs 33, thrust screw 35, and socket 37 to channel member 38 and the base ring structure 16 and 39.

Obviously many modifications and variations of the present invention are possible in the light of the above teachings. It is therefore to be understood that within the scope of the appended claims the invention may be practiced otherwise than as specifically described.

What is claimed is:

1. A transverse load transmitting and mounting apparatus for connecting the firing platform of a charge projector to the base ring structure thereof comprising a trunnion bearing assembly, a base ring bracket, a firing platform bracket partially embracing said base ring bracket, and a trunnion shaft connecting said brackets to one another in tiltable relation, and means for transmitting an unbalanced transverse load imposed on the hinge, said means including a trust screw in longitudinal alignment with said trunnion shaft and having a bearing face adjacent one end of the shaft, a plurality of discs interposed between said firing platform trunnion bracket and said bearing face, and a socket connected to the base ring structure for receiving said thrust screw, said thrust screw being longitudinally adjustable in said socket with respect to the firing platform bracket and serving to by-pass an unbalanced transverse firing load around the trunnion bearings to the base ring structure.

2. A mounting assembly for projector charge launchers comprising a firing platform trunnion bracket, a base ring trunnion bracket, a plurality of bearings, a shaft rotatably securing said trunnion brackets to one another with said bearings being disposed about said shaft and caged between said brackets and said shaft, said shaft protruding outboard of said firing platform trunnion bracket, a plurality of discs rotatably carried by the protruding end of said shaft, a thrust screw having a bearing face engageable with said outermost disc, a socket threadably engaging said thrust screw for longitudinal adjustment of the latter, a rigid supporting member, said socket being secured to said supporting member, and a lock nut threadably connected to said thrust screw for locking the thrust screw in an adjusted position.

3. A mounting assembly for the firing platform of a charge projector comprising a base ring structure, hinge means connecting the firing platform to said base ring structure for tilting movement about a horizontal axis, said hinge means including bearings, a trunnion bracket secured to the firing platform and a shaft carried by the bracket, a rigid supporting member secured to said base ring structure, a socket secured to said supporting member, a thrust screw in longitudinal alignment with said shaft and threadedly connected to said socket for longitudinal adjustment, a plurality of discs disposed between said thrust screw and said bracket whereby an unbalanced transverse firing load by-passes the bearings and is transmitted from the firing platform through the hinge, discs, thrust screw and socket to the base ring structure.

4. The mounting assembly of claim 3 wherein said hinge is further defined as comprising a firing platform trunnion bracket having a pair of depending arms, each of said arms being provided with a transverse bore, a base ring trunnion bracket having an upstanding hollow shank provided with a transverse bore, said upstanding shank being received between said depending arms with said bores in transverse registration with one another for accommodation of said shaft, said bearings caged between the shaft and said trunnion brackets.

References Cited in the file of this patent
UNITED STATES PATENTS

| | | |
|---|---|---|
| 1,742,436 | Debrasky | Jan. 7, 1930 |

FOREIGN PATENTS

| | | |
|---|---|---|
| 8,645 | Great Britain | of 1915 |
| 886,207 | France | June 28, 1943 |